P. M. Randall,
Grinding Metal Surfaces.
Nº 45,175. Patented Nov. 22, 1864.

Witnesses
C. L. Topliff
Henry Morris

Inventor.
P. M. Randall
per Munn & C
atty's

UNITED STATES PATENT OFFICE.

P. M. RANDALL, OF SAN FRANCISCO, CALIFORNIA.

IMPROVED GRINDING-PLATE.

Specification forming part of Letters Patent No. 45,175, dated November 22, 1864.

*To all whom it may concern:*

Be it known that I, P. M. RANDALL, of San Francisco, in the county of San Francisco and State of California, have invented a new and useful Improvement in Grinding-Plates; and I do hereby declare that the following is a full, clear, and exact description thereof, which will enable others skilled in the art to make and use the same, reference being had to the accompanying drawings, making a part of this specification, in which—

Figure 1:
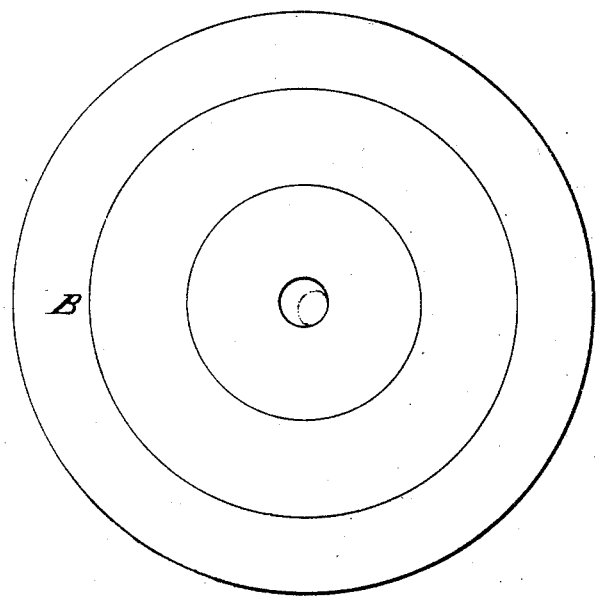
Figure 2:
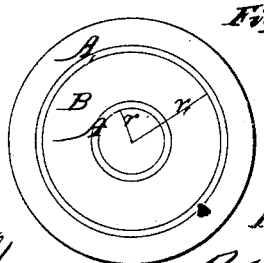

Figure 1 represents a perspective view of a grinding-plate constructed according to my invention. Fig. 2 is a diagram illustrating the grinding effect of and the consequent destructive effect on various portions of a grinding-plate.

Similar letters of reference indicate like parts.

This invention consists in the employment or use in the manufacture of grinding-plates of two or more materials of different hardness arranged so that the softest material is nearest to the center and that said plate becomes harder and harder toward its periphery, and consequently the hardness of the material increases with the destructive effect and the grinding-surface is prevented from wearing uneven or convex.

In order to illustrate the value of this invention, I have shown a diagram, Fig. 2, in which B represents the grinding-plate, and A A$_1$ concentric rings of its grinding-surface, whose radii are $r$ and $r_1$, respectively, and $h$ the width of each ring.

Let $\pi$ denote the ratio between the diameter and circumference of a circle, and we have the area of $$A = \pi[(r+h)^2 - r^2] = \pi(2rh + h^2)$$

and the area of $$A_1 = \pi[(r_1+h)^2 - r_1^2] = \pi(2r_1 h + h^2);$$

or if $h$ is very small so that $h^2$ can be discarded, $$A = 2\pi r h \quad \ldots \ldots \quad 1$$
$$A_1 = 2\pi r_1 h \quad \ldots \ldots \quad 2$$

Let the plate B be revolved about its center O, parallel with its grinding-surface upon another plate, and let S and S be the distances passed over by the two rings at each revolution, and we have $$S = 2\pi r \quad \ldots \ldots \quad 3$$
$$S_1 = 2\pi r_1 \quad \ldots \ldots \quad 4$$

and if $p$ denotes the pressure upon the surface unit, then the work or effect at A will be $$A s p = 4\pi^2 r^2 p h \quad \ldots \ldots \quad 5$$

and at A$_1$ $$A_1 s_1 p = 4\pi^2 r_1^2 p h \quad \ldots \ldots \quad 6$$

and by dividing equation 1 by equation 2 we obtain further $$\frac{A}{A_1} = \frac{2\pi r h}{2\pi r_1 h} = \frac{r}{r_1};$$

or $$A : A_1 = r : r_1 \quad \ldots \ldots \quad 7$$

and by dividing equation 5 by equation 6 we obtain $$\frac{A s p}{A_1 s_1 p} = \frac{4\pi^2 r^2 p h}{4\pi^2 r_1^2 p h} = \frac{r^2}{r_1^2};$$

or $$A s p : A_1 s_1 p = r^2 : r_1^2 \quad \ldots \ldots \quad 8$$

By dividing equation 1 by equation 5 we obtain $$\frac{A}{A s p} = \frac{2\pi r h}{4\pi^2 r^2 h} = \frac{1}{2\pi 2 p};$$

or $$A : A s p = 1 : 2\pi r p \quad \ldots \ldots \quad 9$$

By dividing equation 2$_1$ by equation 6 we obtain $$\frac{A_1}{A_1 s_1 p} = \frac{2\pi r_1 h}{4\pi^2 r_1^2 p h} = \frac{1}{2\pi r_1 p};$$

or $$A_1 : A_1 s_1 p = 1 : 2\pi r_1 p \quad \ldots \ldots \quad 10$$

By dividing the effect on a surface unit of the area A$_1$ as determined by equation 10 by the effect on a surface unit of the area A as determined in equation 9 we have $$\frac{2\pi r_1 p}{2\pi r p} = \frac{r_1}{r} \quad \ldots \ldots \quad 11$$

By these equations we ascertain, first, that on the grinding-surface of circular plates the areas of concentric rings whose width are equal and indefinitely small have the same ratio as their respective radii, (equation 7;) second, that the effects in the process of grinding are in the same ratio as the squares of the radii of the respective rings, (equation 8;) third, that the effect on a surface unit in any ring as A is to the effect on a surface unit in any other ring as A$_1$ as the radius of A is to the radius of A$_1$. (See equation 11.)

Now, since to each unit of effect there is a unit of destruction to the plates, it is evident that the destruction to each unit in $A_1$ will be $$\frac{r_1}{r}$$

times as rapid as to each unit in A; or, if $$r = 1\ r = 5,$$

we obtain from equations 7, 8, and 11

$$\text{area A : arch } A_1 = 1 : 5 \quad \ldots \quad 7'$$
$$\text{effect A } s\, p : \text{effect } A_1\, s_1\, p = 1 : 25 \quad . \quad 8'$$

effect on surface unit in A : effect on surface unit in $$A^1 = 1 : 5 \quad \ldots \quad 11'$$

also, $$\frac{r_1}{r} = \frac{5}{1} = 5$$

Hence the destruction to each unit in $A_1$ will be five times as rapid as to each unit in A, and the tendency of plain circular grinding-plates is to become conically convex by use, and their grinding effect is thereby greatly diminished.

Now, it is obvious what has been demonstrated as to the effect and destruction of the inner and outer parts of plain circular grinding-plates is also true as to conical grinding surfaces, since the surface of each cone can be divided in a series of circular rings of different diameter, but in this case the tendency of the grinding cone is to become more acute and that of the concave to become more obtuse.

In order to overcome these difficulties, I make my grinding-plate B, Fig. 1 of two or more materials of different hardness, such as cast-iron, wrought-iron, and steel, placing the softest material in the center and the hardest at the periphery, and by properly graduating the hardness of the different sections the tendency of the grinding-surface to wear out quicker on one place than on another is obviated.

My invention is not applicable to such grinding-plates of uniform hardness whose grinding surfaces are generated by revolving the involute of a latenary curve about its axis. Such plates will preserve by use equal pressures to equal areas of the entire grinding surface.

Having thus described my invention, I claim as new and desire to secure by Letters Patent—

A grinding-plate, B, the grinding-surface of which is composed of two or more materials of different hardness, the softest material being placed nearest to the center or axis of rotation and the hardest nearest to the periphery or farthest from the axis of rotation, substantially as and for the purpose herein shown and described.

P. M. RANDALL.

Witnesses:
 HENRY HAIGHT,
 E. J. DE STA MARINA.